United States Patent [19]

Buxton

[11] Patent Number: 4,484,477

[45] Date of Patent: Nov. 27, 1984

[54] VARIABLE DELAY MEMORY SYSTEM

[75] Inventor: James L. Buxton, Palo Alto, Calif.

[73] Assignee: S R I International, Menlo Park, Calif.

[21] Appl. No.: 427,693

[22] Filed: Sep. 29, 1982

[51] Int. Cl.³ .................... G01N 29/00; G06F 13/06
[52] U.S. Cl. .................................. 73/626; 364/200;
364/900; 73/628; 367/105
[58] Field of Search .................. 73/626, 625, 628;
367/105; 364/900, 200

[56] References Cited

U.S. PATENT DOCUMENTS

| | | | |
|---|---|---|---|
| 3,761,880 | 9/1973 | Kritz et al. | 364/900 |
| 4,056,851 | 11/1977 | Hovagimyan et al. | 364/900 |
| 4,070,905 | 1/1978 | Kossoff | 73/626 |
| 4,134,149 | 1/1979 | Nord | 364/900 |
| 4,234,940 | 11/1980 | Iinuma | 367/105 |
| 4,257,256 | 3/1981 | Yoshikawa | 73/626 |
| 4,267,584 | 5/1981 | McKeighen et al. | 73/626 |
| 4,290,310 | 9/1981 | Anderson | 73/626 |

Primary Examiner—Howard A. Birmiel

Attorney, Agent, or Firm—Edward B. Gregg; Willis E. Higgins; Urban H. Faubion

[57] ABSTRACT

A variable delay memory system (200) has an addressable memory means (66-1) having a data input port and a data output port. A counter (206) is connected to supply a write address on bus (212) for storage of data supplied to the data input port on bus (64-1). A subtracter means (214) is connected to receive the write address as one input on bus (210) and a second input proportional to a desired delay time on bus (72-1). The subtracter means (214) is connected to supply its output as a read address on bus (216) for data stored in the memory means (66-1) to be supplied at the data output port on bus (76-1). The variable delay memory system (200) is particularly adapted for use of its addressable memory means (66-1) as a delay line in an ultrasonic imaging system (50) with the second input proportional to a desired delay time being supplied by a correlator (70) on the basis of cross-correlations between the RF signals supplied on bus (64-1) and the RF signals supplied on corresponding buses (64-2) through (64-21) for other variable delay memory systems connected to the other channels of the ultrasonic imaging system (50).

6 Claims, 2 Drawing Figures

VARIABLE DELAY MEMORY SYSTEM

CROSS-REFERENCE TO RELATED APPLICATIONS

This application, a concurrently filed, commonly assigned application by Philip S. Green, James F. Havlice and John F. Holzemer entitled "ULTRASONIC IMAGING SYSTEM WITH REFRACTION COMPENSATION" and a concurrently filed commonly assigned application by David A. Wilson, James L. Buxton, Philip S. Green, Donald J. Burch, John F. Holzemer and S. David Ramsey, Jr. entitled "ULTRASONIC IMAGING SYSTEM WITH CORRECTION FOR VELOCITY INHOMOGENEITY AND MULTIPATH INTERFERENCE, USING AN ULTRASONIC IMAGING ARRAY", are directed to related inventions.

BACKGROUND OF THE INVENTION

1. Field of the Invention

This invention relates to an improved variable delay memory system, which may be used as a digital delay line with a controllable, variable delay time. More particularly, it relates to such a memory system which may be implemented with a minimum number of functional elements. Most especially, it relates to such a memory system which may be incorporated in an ultrasonic imaging system and to an ultrasonic imaging system incorporating the memory system.

2. Description of the Prior Art

The use of ultrasonic sound waves in apparatus for the examination of solid objects is now a well known and comparatively well developed art. In such apparatus, an array of ultrasonic transducer elements is used to transmit ultrasonic waves into the object, and reflections of waves from within the object are used to define geometry and related characteristics of the object's interior. Such ultrasonic imaging apparatus has been found to be particularly useful in medical applications as a non-invasive diagnostic tool. The state of the art in such medical applications has been reviewed, for example, by Havlice and Taenzer, "Medical Ultrasonic Imaging," Proceedings of the IEEE, Volume 67, No. 4, Apr. 19, 1979, pages 620 to 641.

Proposals have been made in the prior art to utilize digital electronics in ultrasonic imaging apparatus. For example, Waag, R. C., P. P. K. Lee and R. Gramiak, "Digital Processing to Enhance Features of Ultrasound Images," Proc. Ultrasound Symp., IEEE CH 1120-55U, pages 163-167, J. DeKlerk and B. R. MacAvoy, eds. (1976); and Corl P. D., P. M. Grant and J. S. Kino, "A Digital Synthetic Focus Acoustic Image System for NDE," Proc. 1978 IEEE Ultrasound Symp., pages 263-268 (1978), both disclose the use of such electronics in such systems. However, the systems disclosed there are not suitable for real time correction of time delay errors resulting from inhomogeneities in tissue or other objects being analyzed, nor for the correction of images distorted due to multipath interference of ultrasonic waves generated by the apparatus.

U.S. Pat. No. 4,290,310 discloses an ultrasonic imaging system incorporating digital electronics, in which memories are utilized as delay lines for steering and focusing ultrasonic transducer arrays. However, the delay line memory systems disclosed there do not incorporate any provision for varying the time delay based on the ultrasonic signals received by the apparatus.

Thus, while the art of ultrasonic imaging is a well developed one, there remains a need for the further development of variable delay memory systems for use as delay lines in such imaging systems.

SUMMARY OF THE INVENTION

Accordingly, it is an object of this invention to provide an improved variable digital delay line that can be implemented with a minimum of circuit functions.

It is another object of the invention to provide an improved variable digital delay line in which delay time is changed by varying the number of memory cycles between an address of input data and the use of the address for data output.

It is a further object of the invention to provide a digital delay line memory system in which a length of delay in the memory system may be varied on the basis of a relationship between input data to the system and corresponding input data to other digital delay line memory systems.

It is still another object of the invention to provide an ultrasonic imaging system utilizing such delay lines.

The attainment of the foregoing and related objects may be achieved through use of the novel variable delay memory system and ultrasonic imaging system incorporating the memory system herein disclosed. A variable delay memory system in accordance with the invention has an addressable memory means having a data input port and a data output port. A counter is connected to supply a write address for storage of data supplied to the data input port of the memory means. A read address determining means, such as a subtracter means is connected to receive the write address as one input and a second input proportional to a desired delay time. The read address determining means has an output connected to supply a read address for data stored in the memory means to be supplied at the data output port. In use of the variable delay memory system, the delay time that the data remains stored in the memory means is varied by changing the number of memory cycles between data input and data output of particular information as a result of changing the number-of-cycle difference between a write address and a corresponding read address through changes in the second input to the read address determining means. The second input may be user-selectable from a control panel connected to the memory system, or it may be varied based on comparisons between the input data supplied to the memory system and input data supplied to other such memory systems. For example, cross-correlations between input data to a plurality of such memory systems may be used to correct for time delay errors in ultrasonic signals received by ultrasonic imaging apparatus incorporating a plurality of the variable delay memory systems. Such an ultrasonic imaging system has a plurality of the variable delay memory systems of this invention and a plurality of ultrasonic signal transducers. Each of the transducers is connected to supply data inputs to one of the plurality of variable delay memory systems.

The attainment of the foregoing and related objects, advantages and features of the invention should be more readily apparent to those skilled in the art, after review of the following more detailed description of the invention, taken together with the drawings, in which:

DETAILED DESCRIPTION OF THE INVENTION

Figure 1:
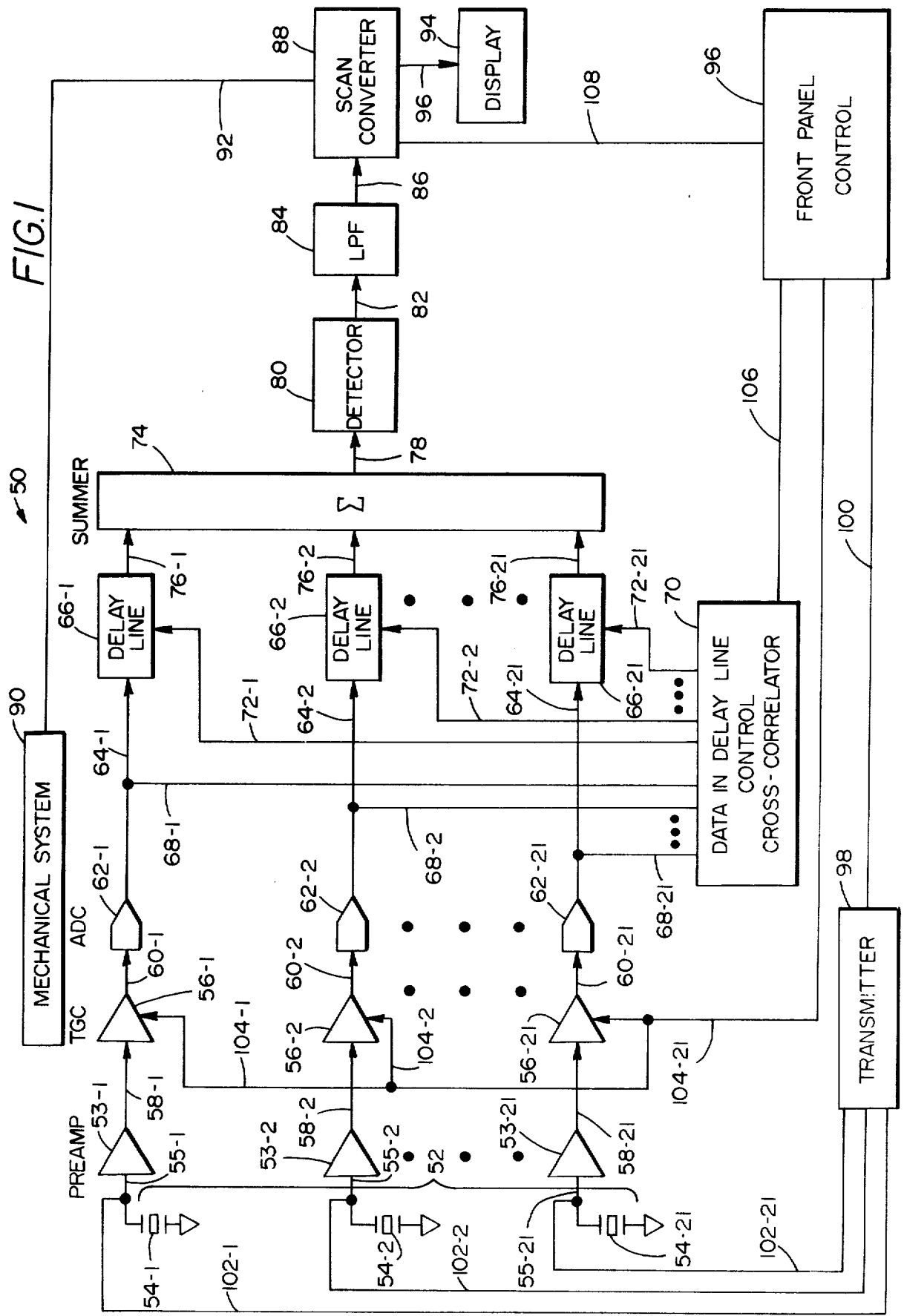
FIG. 1 is a block diagram of a system which incorporates the present invention.

Turning now to the drawings, more particularly to FIG. 1, there is shown a sector scan ultrasonic imaging apparatus 50 which incorporates the present invention. The apparatus 50 includes an array 52 of ultrasonic transducers 54-1 through 54-21. The transducer elements 54-1 through 54-21 are each connected to a preamplifier 53-1 through 53-21 by lines 55-1 through 55-21. The outputs of preamplifiers 53-1 through 53-21 are each connected to a time gain controlled amplifier 56-1 through 56-21 by lines 58-1 through 58-21. Amplifiers 56-1 through 56-21 have their output connected by lines 60-1 through 60-21 to analog/digital (A/D) converters 62-1 through 62-21. The A/D converters 62-1 through 62-21 have their outputs connected by lines 64-1 through 64-21 to delay lines 66-1 through 66-21. The outputs of A/D converters 62-1 through 62-21 are also connected by lines 68-1 through 68-21 to cross-correlation processor 70 (hereinafter also called a correlator). The correlation processor 70 is also connected by lines 72-1 through 72-21 to the delay lines 66-1 through 66-21. The delay lines 66-1 through 66-21 are connected to a summing circuit 74 by lines 76-1 through 76-21. Output line 78 from summing circuit 74 is connected to a detector circuit 80. Output line 82 from the detector circuit 80 is connected to a low pass filter (LPF) circuit 84. Output line 86 from the LPF circuit 84 is connected to scan converter circuit 88. A mechanical scanning system 90 of a known type, which oscillates the transducer array 52 to produce the sector scan, is also connected to the scan converter circuit 88 by line 92. The scan converter circuit 88 converts angular coordinates of the mechanical scan produced by the mechanical system 90 to XY coordinates for display 94, which is connected to the scan converter circuit 88 by line 96. Display 94 is of the conventional raster scan type.

Front panel controls 96 are connected to ultrasonic transmitters 98 by line 100. The ultrasonic transmitters 98 are respectively connected to the transducer elements 54-1 through 54-21 by lines 102-1 through 102-21. The front panel controls 96 are also connected to the time gain controlled amplifiers 56-1 through 56-21 by lines 104-1 through 104-21. In addition, the front panel controls 96 are connected to the correlator 70 by line 106 and to the scan converter circuit 88 by line 108.

As will be explained more fully below, the delay lines 66-1 through 66-21 are implemented as dual port addressable memories in the form of the memory system shown in FIG. 2. The correlator 70 is preferably implemented with buffer memories and a microcomputer, with the microcomputer utilizing the cross-correlation data to generate addresses on lines 72-1 through 72-21 for the simultaneous release of signal information from the delay lines 66-1 through 66-21 to the summing circuit 74 to implement the correction of time delay image distortion. In order to correct multipath interference, the microcomputer of the correlator will cause the address for a signal to be eliminated to be omitted on the control lines 72-1 through 72-21. In an alternative embodiment of the system, the cross-correlation circuit 70 could supply appropriate signals on selected ones of the lines 72-1 through 72-21 to attenuators (not shown) included in the delay lines 66-1 through 66-21 to modify the gain of their output signals.

In operation of the system shown in FIG. 1, ultrasonic signals supplied by transmitter 50 are transmitted by transducer elements 54-1 through 54-21 into tissue or other object to be examined by the apparatus. These signals are reflected from within the tissue or other object being examined back toward the transducers 54-1 through 54-21. As a result of inhomogeneities within the tissue or other object, the reflected signals received at the transducers 54-1 through 54-21 are delayed for one or more of the transducers relative to the signals received at the other transducers, and multipath interference, refraction or obstruction produces signal distortion at one or more of the transducers 54-1 through 54-21. The signals supplied on lines 58-1 through 58-21 are therefore not in phase with respect to one another. The amplified signals are supplied on lines 60-1 through 60-21 to the A/D converters 62-1 through 62-21 and converted to digital form. The resulting digitized signals are supplied to the delay lines 66-1 through 66-21 and to the correlator 70 by lines 64-1 through 64-21 and 68-1 through 68-21. As a result of the cross-correlation calculations, addresses for the signals to be supplied by delay lines 66-1 through 66-21 in phase with one another on lines 76-1 through 76-21 are supplied on lines 72-1 through 72-21 to the delay lines 66-1 through 66-21. For any signals having unusually low correlations, which indicate a multipath interference, refraction or obstruction, the address for that signal is omitted or its gain is otherwise modified, thus correcting for the effect of the multipath interference, refraction or obstruction. The in phase information signals on lines 66-1 through 66-21 are added in summing circuit 74 and supplied through detector circuit 80 and LPF circuit 84 to scan converter circuit 88. Scan converter circuit 88 utilizes the sector scanning information supplied by mechanical system 90 on line 92 and the summed simultaneous signals to generate an ultrasonic image on display 94.

Figure 2:
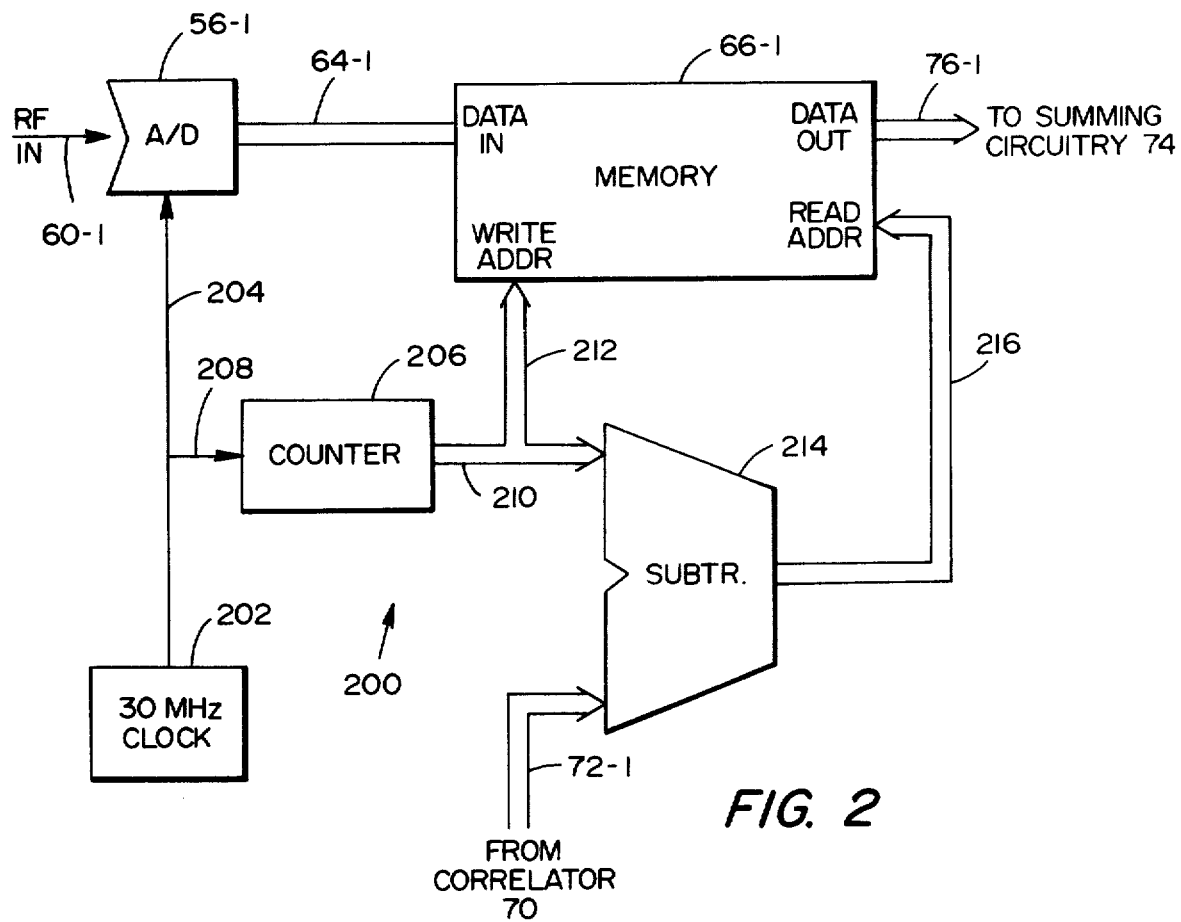
FIG. 2 is a block diagram of a subsystem in the system of FIG. 1 in accordance with the invention.

FIG. 2 is a block diagram of a variable delay memory system 200, which has special utility in the ultrasonic imaging system 50 of FIG. 1. In FIG. 2, the delay line 66-1 of FIG. 1 is shown implemented as an addressable memory, for example, a random access memory, having a minimum of M addresses, where M is an integer obtained by dividing the maximum delay to be obtained with the memory 66-1 by the clock frequency utilized to define address cycles in the delay line memory 66-1. The delay line memory 66-1 has its data input port connected by bus 64-1 to the output of A/D converter 56-1, the input of which receives an analog RF signal on line 60-1. An output port of the delay line memory 66-1 is connected to summing circuitry 74 by bus 76-1.

A 30 MHz clock 202 is connected by line 204 to the A/D converter 56-1, and to counter 206 by the lines 204 and 208. The clock signals from clock 202 are used as command signals for the A/D converter to convert the analog signal present on line 60-1 during a clock signal to digital data supplied to the delay line memory 66-1 on bus 64-1. The clock signal from clock 202 also serves to increment counter 206 for generating a write address for the digital data. Counter 206 has its output connected by bus 210 and bus 212 to a write address terminal of delay line memory 66-1. Bus 210 also connects the output of counter 206 to provide one input to subtract circuit 214. The other input to subtract circuit 214 is supplied as a delay signal from correlator 70 on bus 72-1. The output from subtract circuit 214 is supplied as a read address on bus 216 to the read address terminal of the delay line memory 66-1. If the delay line memory 66-1 is constrained modulo M, the function of subtract circuit 214 can be implemented with an adder. The delay line memory 66-1 may also be somewhat larger than M in size, e.g., 128 addresses in a commercially available part where the required value of M is actually 94.

In operation of the variable delay memory system 200, a clock signal on lines 204 and 208 initiates conversion of the analog signal on line 60-1 to digital signals supplied on bus 64-1 to the delay line memory 66-1. Counter 206 simultaneously generates address signals specifying a location in the delay line memory 66-1 in which the digital signals on bus 64-1 are to be stored. That address is supplied on bus 212 and the signals on bus 64-1 are written at the specified location. The generated address is also supplied to the subtract circuit 214 by bus 210, and a delay signal from the correlator 70, supplied on bus 72-1, is subtracted from the write address to produce a read address supplied on bus 216 to the delay line 66-1. The delay signal supplied on bus 72-1 is proportional to a desired delay time as determined by correlator circuit 70 divided by the clock frequency. As a result, the address supplied on bus 216 from the subtract circuit 214 lags the address supplied on write address bus 212 by a variable number of clock cycles, depending on the magnitude of the delay signal. In the embodiment of FIG. 2, the delay signal on bus 72-1 is supplied by the correlator 70 in the ultrasonic imaging system 50 of FIG. 1. The delay signal could be supplied from another source, such as from userselected inputs for steering and focusing of the ultrasonic array. Through operation in this manner, the read and write addresses are constrained to be modulo M. A varying delay in the delay line memory 66-1 is a slowly varying function compared to the 30 MHz clock rate. The correlator 70 feeds different delay signals to other channels in the ultrasonic imaging system 50 of FIG. 1, i.e., to delay lines 66-2 through 66-21, depending on the results of the cross-correlations performed by correlator 70, or other inputs, such as for focusing or steering the ultrasonic signals. If the cross-correlation between the data input signals on bus 64-1 and on a corresponding bus 64-2 through 64-21 shows that there is multipath interference of the ultrasonic signals from which the data input signals at bus 64-1 are derived, no read address output from the subtracter 214 is desired. This result may be achieved by making the delay signal equal to the address on bus 210, or simply by inhibiting the output from the subtracter 214.

In a specific example, if a maximum delay of two microseconds is desired with the variable delay memory system 200, the delay line memory 66-1 need only have a large enough capacity to store a total of 60 samples, one of which is supplied on bus 64-1 with each clock signal from the clock 202. A complete delay line 66-1 can be built with presently available emitter-coupled logic (ECL) integrated circuits with a total of only five such integrated circuits.

It should now be apparent to those skilled in the art that a variable delay memory system and ultrasonic imaging system in accordance with the invention capable of achieving the stated objects of the invention has been provided. By varying the number of memory cycles between the storage of information at a particular address in the delay line memory and reading the information out from that address on the basis of a variable delay signal, the delay in the delay line memory may be varied as in a smooth, slowly varying function. Utilizing a varying delay signal to modify the write addresses in the variable delay memory system of this invention allows such variations to be achieved with a minimum of functional circuit elements. While such a variable delay memory system should find use in a wide variety of applications, it is especially adapted for use in an ultrasonic imaging system for compensating time delay errors and refracted signal distortions, as well as for other purposes, such as steering or focusing the ultrasonic signals.

It should further be apparent to those skilled in the art that various changes in form and details of the invention as shown and described may be made. It is intended that such changes be included within the spirit and scope of the claims appended hereto.

What is claimed is:

1. A variable delay memory system, which comprises an addressable memory means having a data input port and a data output port, a means connected to supply a write address for storage of data supplied to the data input port of said memory means, a read address determining means connected to receive the write address as one input and a second input proportional to a variable delay time, said read address determining means being configured to calculate a read address by modifying the write address with the second input, said read address determining means having an output connected to supply the calculated read address determined from the write address and the second input for data stored in said memory means to be supplied at the data output port.

2. The memory system of claim 1 additionally comprising an analog to digital converter connected to supply digital data to the data input port of said memory means.

3. The memory system of claim 2 in which said write address supplying means is a counter and said counter and said analog to digital converter are synchronously operated under control of a common clocking means.

4. The variable delay memory system of claim 1 in which the second input proportional to the desired delay is obtained from a cross-correlation of the data supplied to the data input port of said memory means with corresponding data supplied to another delay memory system in accordance with claim 1.

5. An ultrasonic imaging system incorporating a plurality of the variable delay memory systems of claim 1 and a plurality of ultrasonic signal transducers, each connected to supply data inputs to one of said plurality of variable delay memory systems.

6. The variable delay memory system of claim 1 in which said read address determining means is a subtracter.

* * * * *